United States Patent [19]

Nelson et al.

[11] 4,410,896

[45] Oct. 18, 1983

[54] APPARATUS FOR PREVENTING REMOVAL OF TONER FROM TRANSFERRED IMAGES

[75] Inventors: Alfred M. Nelson, Redondo Beach, Calif.; Houshang Rasekhi, Convent Station, N.J.

[73] Assignee: Wang Laboratories, Inc., Lowell, Mass.

[21] Appl. No.: 253,997

[22] Filed: Apr. 13, 1981

[51] Int. Cl.3 ...................... G01D 15/12; G03G 15/16

[52] U.S. Cl. ................................ 346/74.2; 355/3 TR; 355/14 TR

[58] Field of Search ................. 355/3 R, 3 TR, 3 CH, 355/14 TR, 14 CH; 346/153.1, 160, 74.2; 361/229, 235; 430/102, 126

[56] References Cited

U.S. PATENT DOCUMENTS

| | | | |
|---|---|---|---|
| 3,647,292 | 3/1972 | Weikel | 355/3 TR |
| 3,830,589 | 8/1974 | Allen | 355/3 TR |
| 3,976,370 | 8/1976 | Goel et al. | 355/3 TR |
| 3,996,466 | 12/1976 | Davis | 355/3 TR X |
| 4,140,962 | 2/1979 | Quinn | 355/3 CH X |
| 4,175,265 | 11/1979 | Nelson et al. | 346/153.1 |
| 4,217,819 | 8/1980 | Tluck et al. | 355/3 TR X |

FOREIGN PATENT DOCUMENTS

| | | | |
|---|---|---|---|
| 52-37042 | 3/1977 | Japan | 355/3 TR |

*Primary Examiner*—Fred L. Braun

*Attorney, Agent, or Firm*—Michael H. Shanahan; Joseph F. Funk

[57] ABSTRACT

A magnetographic copier system in which images recorded on a magnetic tape are developed by toner with magnetic properties and where the toner particles are also electrostatically charged. A piece of paper is brought into contact with the tape at a toner transfer station and a first momentary electric field of the proper polarity and orientation is then used to transfer the developed toner images from the tape to paper. The paper and tape segments with the images are then separated and are moved away from the toner transfer station. An electrode external to the transfer station is then used to apply another electric field of the same polarity to the developed toner images on the paper to prevent the toner from being disturbed by the next occurrence of the first electric field for subsequent toner images being transferred to the paper.

6 Claims, 20 Drawing Figures

APPARATUS FOR PREVENTING REMOVAL OF TONER FROM TRANSFERRED IMAGES

BACKGROUND AND SUMMARY OF THE INVENTION

Certain magnetographic printing systems such as those described in the above-mentioned application utilize a transfer electrode to generate an electrostatic field for transferring successive lines of toned images from an imaged magnetic tape medium to paper. In such systems, there can be a tendency for portions of the image of a previously transferred (printed) line to become disturbed or lost (i.e., toner from portions of the image of the previously transferred line may become disturbed or lifted from the paper by the tape) resulting in degraded, non-uniformly toned (non-uniformly opaque) image lines. Generally this so-called "lift-off" (removal) of a portion of a previously transferred line occurs during transfer of a subsequent image line to paper, when a portion (generally, an edge) of the tape is brought into contact with the previously transferred line, and/or when the electrostatic field generated by the transfer electrode cause the transferred particles to migrate away from the previously transferred image and toward the source of the field (viz., the transfer electrode). This toner disturbance or removal problem may become aggravated due to formation of exposed charge-accumulating areas on the tape occasioned by, for example, tape wear.

What is needed and would be useful, therefore, is an apparatus which, after a line of toned images is transferred to the toner-receiving medium (e.g., paper), would be capable of preventing disturbance and/or loss of toner from the transferred image despite contact or engagement of the transferred image with a portion of the tape or other image-carrying medium, and despite the action of the transfer electrode during image transfer.

Thus, in accordance with the broader aspects of the illustrated preferred embodiment(s) of the present invention, apparatus is provided which is capable of substantially preventing disturbance and removal of toner particles from previously transferred images. The apparatus operates as part of a magnetographic printing system, wherein a magnetic tape having a toned image thereon is capable of being moved into contact with and thereafter away from a selected front surface of a paper, thereby transferring charged toner particles from imaged areas on the tape to the paper's front surface.

The apparatus comprises an electrode positioned proximate to a rear surface of the paper opposite to the transferred particles (the transferred particles representing a previously transferred line) on the front surface, the electrode being responsive to an applied signal having a predetermined polarity, for example opposite to that of the transferred particles, for creating an electric field restraining the transferred particles to the front surface, thereby preventing migration of the particles during the transfer operation, and preventing disturbance and removal (lift-off) of the previously transferred particles from the paper by the tape when the tape is brought into contact with and subsequently becomes separated from the paper during the current transfer operation. The position of the electrode relative to the transferred image and to the image to be transferred from the tape, as well as the voltage applied to the electrode, are selected such that the electric field created by the electrode is effective to restrain the transferred particles from leaving the paper yet does not adversely affect particles being transferred or particles situated on the tape to be transferred to paper.

BRIEF DESCRIPTION OF DRAWINGS

The above-mentioned objectives and features will become better understood with reference to the following detailed description taken in conjunction with the accompanying drawings, in which:

FIGS. 5A–5E are waveform diagrams illustrative of principal events occurring in connection with the transfer station of FIGS. 2 and 3;

DESCRIPTION OF PREFERRED EMBODIMENTS

Figure 1:
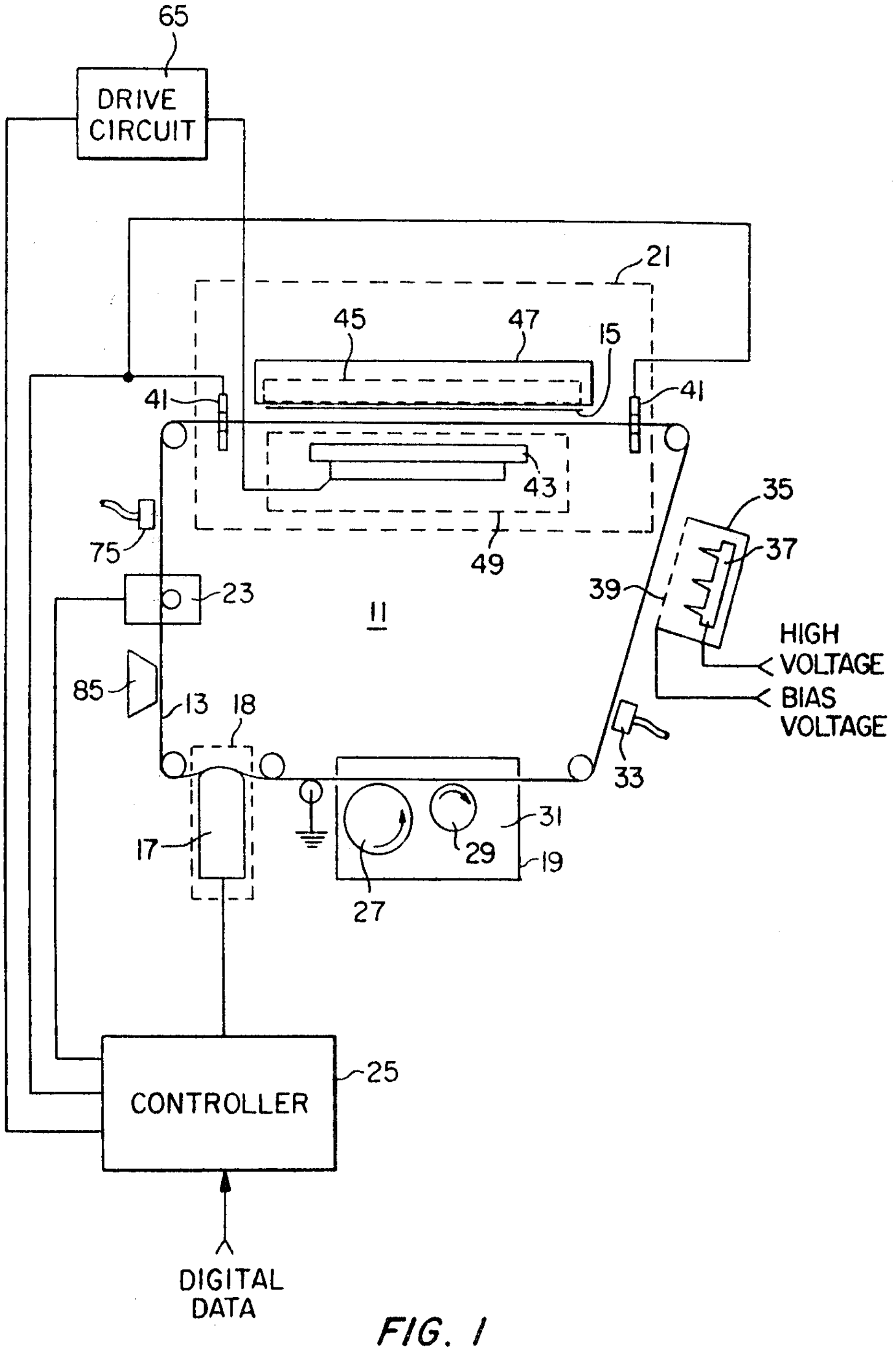
FIG. 1 is a combined schematic and block diagram of a system incorporating the present invention.

Referring now to FIG. 1, there is shown a magnetographic printing apparatus or system 11 responsive, for example, to applied digital data, for recording data images on an endless magnetizable medium or web such as a magnetic tape or band 13, for toning or developing the image, for transferring the toned image to paper 15, and retaining the image on the paper (i.e., prevent disturbance and removal of portions of the image from paper) during subsequent image transfer to produce high quality printed output at relatively high-speed operation. The magnetizable medium 13 is electrically conductive. The apparatus includes a magnetic recording head 17 for creating a magnetic latent image on tape 13, a developer station 19 for developing the latent image by applying toner (dry magnetically attractable ink particles contained in the developer station) to the latent image, and a transfer station 21 for transferring toner from the developed image to paper 15 or some other medium, and retaining the transferred toner on the paper. The latent image creation and development operations may be performed in much the same manner as described in U.S. Pat. No. 4,110,758 issued to Nelson et al.

As shown in FIG. 1, tape 13 is operatively coupled to a shaft of motor 23 and is advanced by the motor as a closed loop through the various stations of the system. As the tape 13 passes recording station 18, recording head 17 records a magnetic latent image onto the tape. The tape is then advanced to developer station 19 where toner applicator brush or drum 27 develops the latent image by applying magnetic toner particles to the tape. The magnetized latent image areas on the tape attract the toner, thereby developing (toning) these image areas. Excess toner is removed from the tape by a scavenger brush or drum 29 and returned to toner reservoir 31. As a further aid in cleaning the tape (i.e., removing unwanted toner from the tape), a first vacuum outlet 33 coupled to a vacuum source (not shown) provides a suction of air across the imaged (front) surface of the tape to remove background toner particles not tightly bound by the magnetic forces exerted by the image areas.

Following developing and cleaning, the toner particles remaining on the tape are charged by a scorotron 35. The scorotron provides an ionizing source 37 and a bias screen 39 proximate to the tape surface to charge the toner particles on the tape prior to transfer of the toner to the paper. The screen 39 of the scorotron 35 is maintained at a constant potential to ensure that the toner receives a uniform charge.

After the recorded latent image is developed, the tape is cleaned, and the toner particles on the image areas are charged, the tape 13 is advanced to transfer station 21. In the examples of embodiments herein depicted, the tape 13 is comprised of a predetermined number (e.g., three) of segments for recording latent images. A hole (not shown) is formed through the tape preceding each such segment, a segment representing a length of tape used to print a line of characters (symbols). It will be appreciated that tape 13 could provide two or more lines of characters simultaneously to the transfer station. As a tape segment is moved into position in transfer station 21, light from a light source of photosensor arrangement 41 passes through the hole and is detected by a detector of photosensor 41. In response to the detection of the hole, photosensor arrangement 41 applies a signal to controller 25 which brakes and stops the motor 23 (e.g., by applying a reverse polarity signal, then no signal to the motor) to position the tape segment within transfer station 21 in preparation for image transfer.

Figure 2:
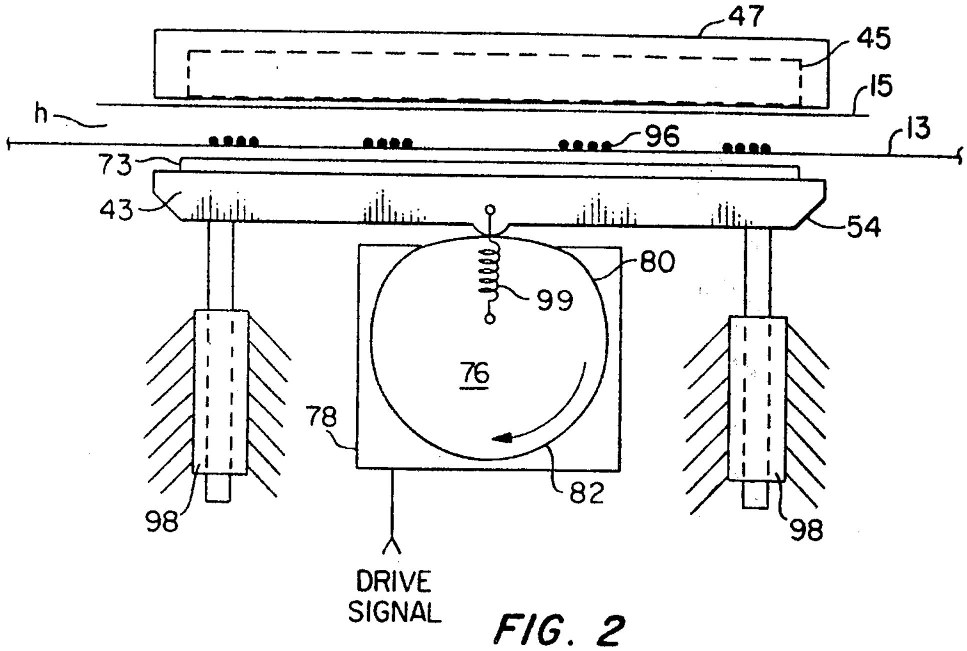
FIG. 2 is a combined schematic and block diagram illustrating a preferred transfer station embodiment of the system of FIG. 1 incorporating the present invention.
Figure 3:
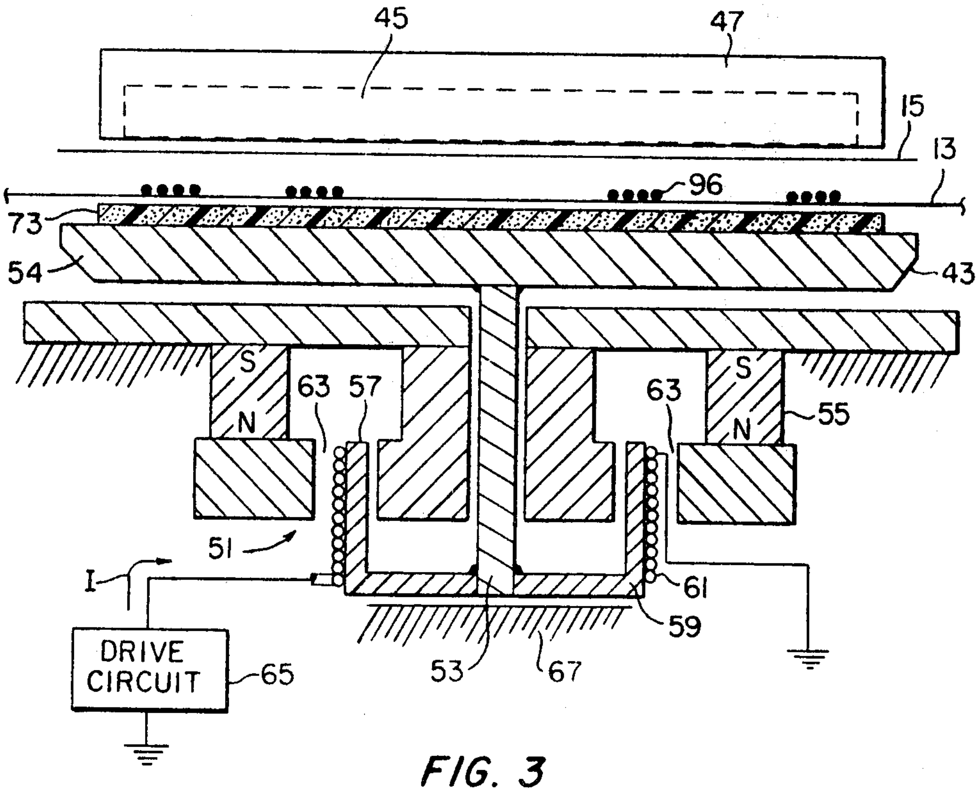
FIG. 3 is a combined schematic and block diagram illustrating a second embodiment of transfer station of the system of FIG. 1 incorporating the present invention.

With the tape segment having the toned image positioned thus for transfer, a moveable platen 43 of a tape positioner 49 is then actuated from the controller 25 via drive circuit 65 to press the tape segment with its toned image into gentle contact with the paper 15. A transfer voltage (pulse) is then applied to electrode 45 contained in back plate 47 located adjacent to and above paper 15 which creates an electrostatic force attracting toner from the toned image to the paper during the transfer period. While electrode 45 is shown in FIGS. 2 and 3 somewhat apart from paper 15 for ease of illustration, the electrode is, in fact, in contact with the paper during transfer. Following image transfer, platen 43 is returned to an open (non-contact) position.

The tape is then advanced by motor 23 as governed by controller 25 such that the tape segment corresponding to the transferred developed image passes by a second vacuum outlet 75 which removes any residual toner particles from the tape's surface. Thereafter, the tape segment advances to a station 85 where the imaged portions are magnetically reoriented, thus preparing the tape segment for the next imaging operation.

FIG. 2 shows a preferred embodiment of the transfer station 21, a portion (backplate 47) of which station incorporates the present invention. The segment of tape 13 carrying an imaged line of text is shown in position between the paper 15 and platen portion 43 of the transfer station 21. Platen 43 includes a horizontal portion 54 bearing a resilient covering 73 on its operative face. Situated behind the paper 15 is the transfer electrode 45 as contained in vacuum backplate 47. The paper 15 is maintained uniformly on the flat lower surface of backplate 47 by the presence of a controlled negative pressure thereon which communicates with the paper via a suitable arrangement of apertures (not shown) in the backplate's lower surface. As illustrated, an initial gap h (exaggerated for ease of understanding) exists between the tape medium 13 and the paper 15.

Platen 43 is mounted upon a pair of rods housed in respective relatively long bearings 98 suitably affixed to the frame (not particularly shown) of the system. Movement of platen 43 is governed by a drive arrangement 78 which comprises an eccentrically mounted cam 76 having cam surfaces 80 and 82 in contact with the lower surface of platen 43. Cam 76 is secured to platen 43 via a spring 99, and the cam drive shaft is securely maintained in position relative to the system's frame.

Figure 5E:
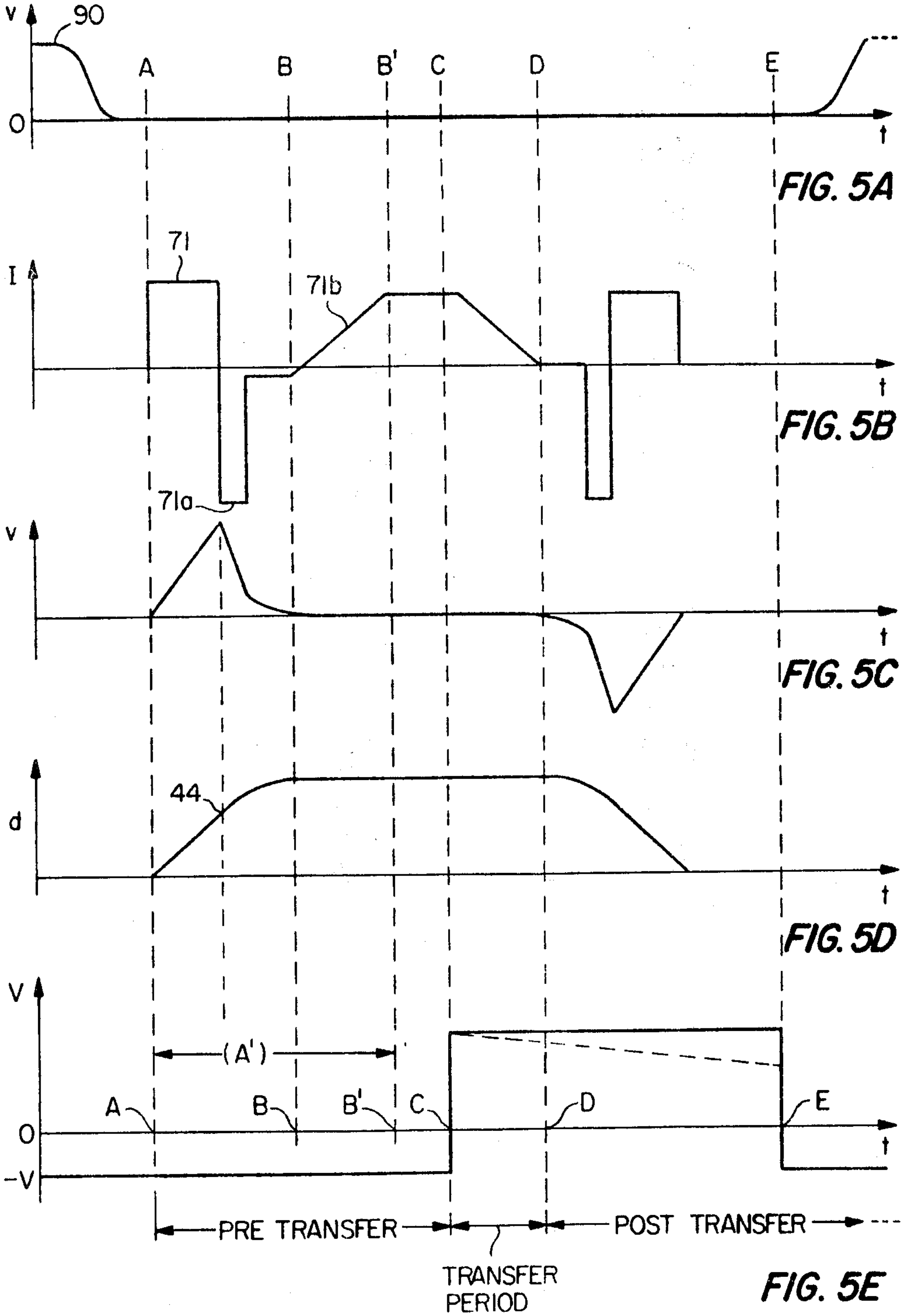
Figure 6A:
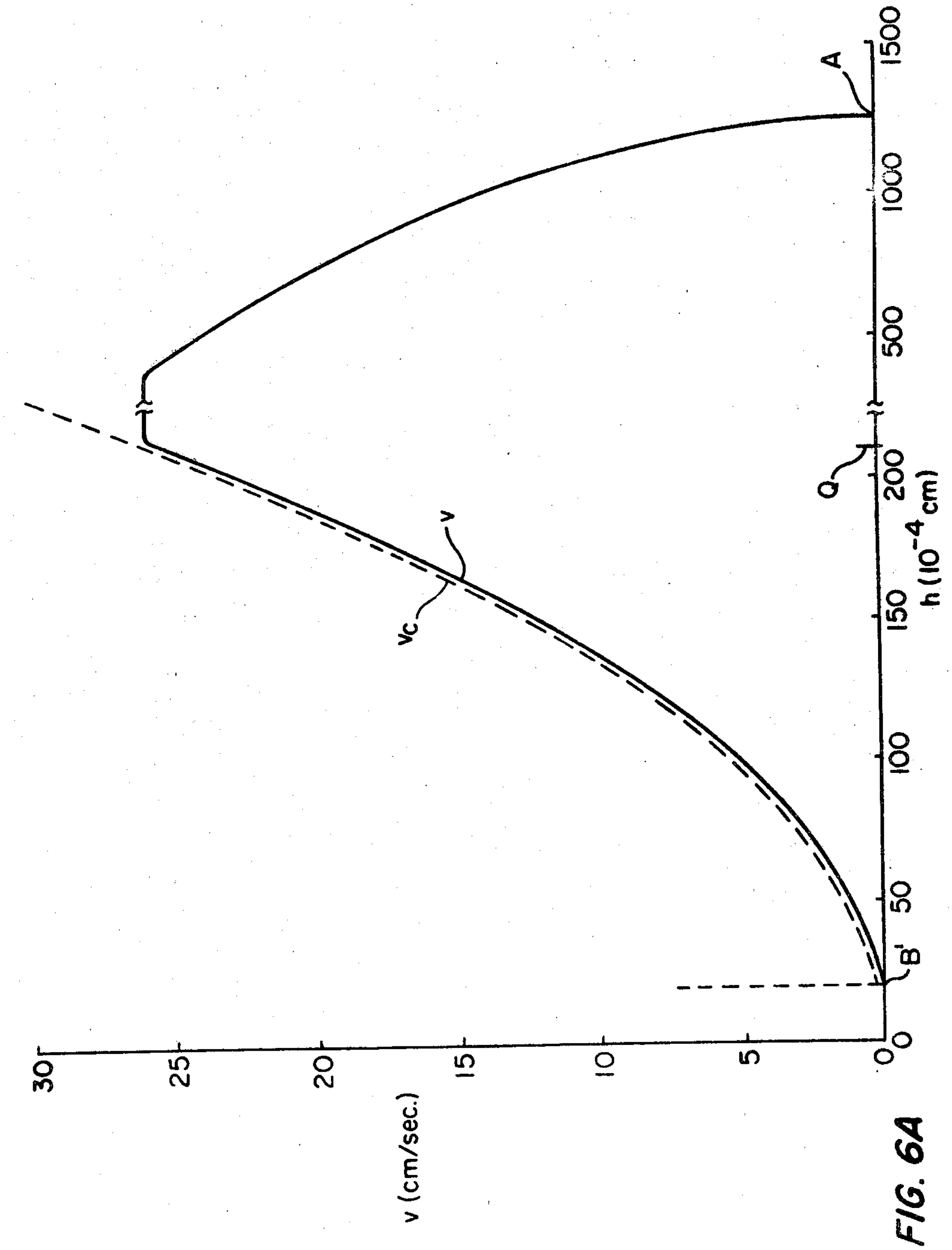
FIGS. 6A and 6B are waveform diagrams illustrating velocity profiles of relative approaching movement of the tape and paper as a function of respectively instantaneous separation and time.
Figure 6B:
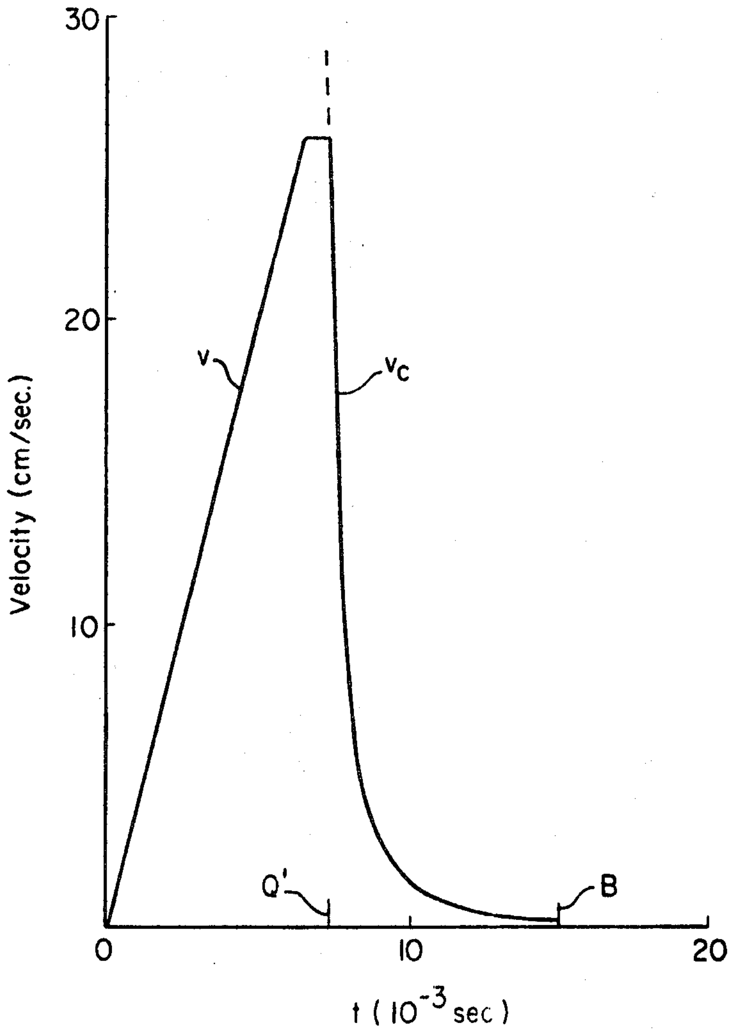

In operation, a drive signal is input to arrangement 78 (FIG. 2) which actuates and governs continuous rotation of the cam whereby the cam surfaces 80 and 82 thereof urge platen 43 upward at an instantaneously varying velocity (e.g., as depicted in FIGS. 5C and 6B) such that the tape 13 controllably approaches the paper 15 situated on the lower surface of backplate 47. Alternatively, arrangement 78 could comprise an eccentrically mounted cam having a less complex operating surface, which is driven by a stepping motor fed by an input control or drive signal of varying frequency corresponding to a selected velocity profile as shown in FIG. 6B. Design of a cam in accordance with the velocity profile may be made according to known methods reflected in the text "Cams" by H. Rothbart published by Weley & Sons, New York, U.S.A.

In alternative arrangement (not particularly shown), unit 78 could be replaced by a spring-loaded bellows arrangement suitably coupled to a hydraulic system terminating in a cam-driven second bellows arrangement, the cam being contoured or configured so as to provide movement of the platen in accordance with a selected velocity profile. In this way, substantially all of the mechanical apparatus associated with the platen may be housed remotely from the transfer station, without sacrificing operation efficiency.

FIG. 3 shows another embodiment of the transfer station 21. Tape positioner 49 (FIG. 1) comprises, as before, moveable platen 43, and in this embodiment a vertically moveable coil actuator 51.

Platen 43 includes a vertical portion 53 and a horizontal or bar portion 54. Vertical portion 53 serves to rigidly couple bar portion 54 to actuator 51. Actuator 51, in turn, includes a ring-shaped permanent magnet 55 and an armature 57. The armature 57 comprises a cylindrically shaped member 59 (illustrated in cross-section in FIG. 3) about which is wound a predetermined number of turns of conductor 61. Armature 57 and the vertical portion 53 of platen 43 are positioned for vertical motion within air gap 63 of ring magnet 55. Member 59 is constructed preferably of aluminum, which serves to damp the movement of the actuator to eliminate jitter.

In response to a drive current signal applied by drive circuit 65 to armature 57 of actuator 51, a force proportional to the current in the conductor 61 in the magnetic field provided by ring magnet 55 serves to move platen 43, and in particular the horizontal bar 54, to bring the tape 13 rapidly into contact with the paper 15. Separation thereafter is achieved through the combination of the drive current and gravity.

Figure 4A:
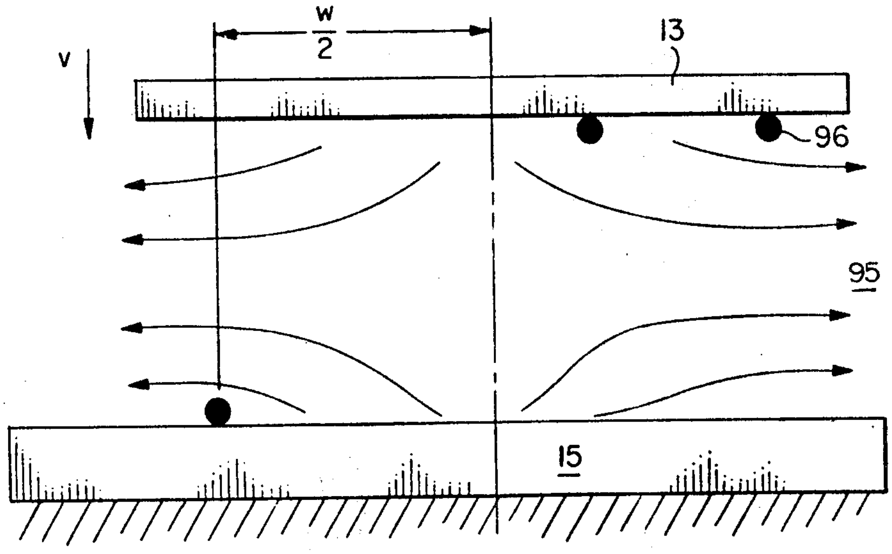
FIGS. 4A and 4B illustrate air currents generated by the relative approaching movement of the toned medium and paper and the tendency thereof to affect toner particle arrangement.
Figure 4B:
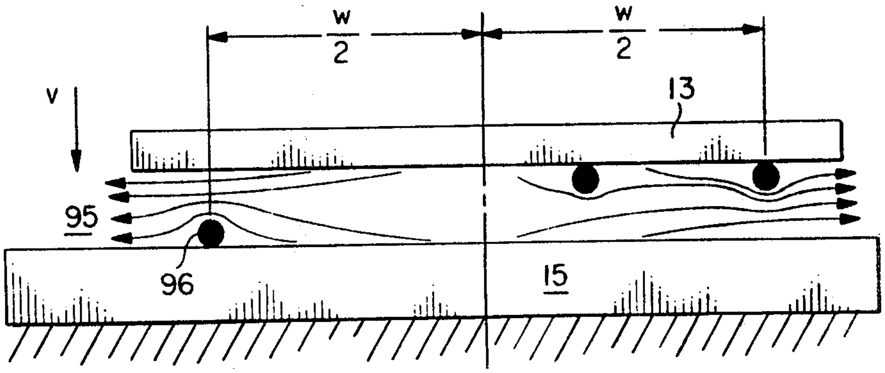

FIG. 4A illustrates the two-dimensional air currents 95 caused by the relative approaching movement of tape 13 and paper 15 at a velocity v for a relatively large separation distance between the tape and paper. Of course, similar air currents (though opposite in direction) are generated in reverse during relative separating movement between the tape and paper. As shown, the air currents are directed outward and away from the center of the tape, tending to influence (disturb) the toner particles 96. In FIGS. 4A and 4B particularly, the relative dimensions of tape 13, toner 96, paper 15, etc. have been exaggerated for ease of illustration and understanding.

FIG. 4B shows the generated air currents 95 for the case of a relatively smaller tape-to-paper separation and how the toner particles 96 are then affected thereby. As illustrated, the toner particles farther away from the center line of the tape (i.e., toward the edge of the tape) experience higher air currents than do particles nearer the center and are, therefore, more vulnerable to the potentially disturbing forces caused by the air currents. Thus, "w" in FIGS. 4A and 4B is that width of the tape which accounts for the largest disturbing forces, i.e., those forces which are experienced by the toner particles near the edges of the tape.

For the particular case of a narrow tape (narrow in comparison to its length within the transfer station and to the dimensions of the paper), after repeated calculations and empirical tests, the instantaneous critical (maximum) velocity at which the tape may be allowed to approach paper, without creating a force ($f_2$) that would disturb the toner particles, has been found to be approximately according to the following equations:

$$v_c = f_1^{\frac{1}{2}} (k\rho)^{-\frac{1}{2}} \cdot h^2/r^2 \cdot 1/w \quad \text{(I)}$$

$$f_2 = v^2\left(k\rho \frac{r^4}{h^4} w^2\right) < f_1, \text{ and } v \leqq v_c \quad \text{(II)}$$

where $v_c$ is the tape critical velocity, v is the actual or instantaneous tape velocity, $f_1$ is the total force holding the toner particles to the tape, $f_2$ is the disturbing or lift force exerted on a toner particle by the air currents generated between the tape and paper, $\rho$ is the density of the air (e.g., $1.3 \times 10^{10-3}$ gm/cc), h is the instantaneous separation distance between the tape and paper media, r is the radius of one of the largest sized toner particles, expected in significant proportion, 2 is the width of the tape, and k is a tape geometry factor or proportionality constant $\approx 9\pi$ for tape configurations where the ratio of tape width (w) to tape segment length (l) within the transfer region is $<<1$ (e.g., where $w < 2.5$ cm and $l = 25$ cm in the examples depicted herein). As this ratio approaches 1, k would become $<9\pi$.

Referring to equation I, it can be observed that the instantaneous tape-to-paper critical (maximum) velocity is directed proportional to the square of the instantaneous tape-to-paper distance (h) and inversely proportional to the square of the radius (r) of the toner particles and the width dimension (w) of the tape medium. A direct relationship between the critical velocity (vc) and the square root of the air current forces ($f_2$) generated between tape and paper is also shown. Equation I in particular predicts the relative sensitivity of the tape critical velocity ($v_c$), to the separation distance (h).

To avoid disturbing the arrangement of the toner particles during relative approaching movement, and indeed relative separating movement as well, the instantaneous tape velocity (v) must not exceed the instantaneous critical velocity ($v_c$), expressed by equation I in terms of instantaneous relative separation (h). In other words, as shown in equation II, the air current (aerodynamic) forces ($f_2$) must remain less than the total toner-holding force ($f_1$) so that toner-holding force ($f_1$) is equal to the sum of the magnetic and electrostatic forces ($f_m + f_e$ or alternatively $f_m + f_e + f_b$, described hereinafter) holding the toner onto the tape.

FIG. 5A illustrates the tape transport velocity profile of a toned segment of the tape in the vicinity of the transfer station. FIG. 5B shows a preferred drive current waveform (if employing the embodiment of FIG. 3) applied by drive circuit 65 to coil 57 of actuator 51. FIG. 5C shows a platen velocity profile corresponding, for example, to the rotation of cam 76 (FIG. 2) or the drive current (FIG. 5B) applied from drive circuit 65 to actuator 51 (FIGS. 3). FIG. 5D shows platen displacement effected by cam 76 (FIG. 2), or effected by actuator 51 away from fixed stop 67 (FIG. 3). FIG. 5E illustrates the bias (e.g., −100 volts) and transfer (e.g., +600 volts) potentials which effect the electrostatic forces governing the transfer of the toner. It is to be noted that FIGS. 5A–5E are exemplary and are somewhat exaggerated for ease of illustration.

Once the toned portion of tape 13 has arrived at the transfer station 21, the tape is brought to a halt as shown by curve 90 of FIG. 5A. A drive signal input to cam drive arrangement 78 (FIG. 2) causes the platen 43 and thus the toned web 13 to rapidly accelerate (e.g., at approximately $4 \times 10^3$ cm/sec$^2$) toward the paper as indicated in FIG. 5C. Alternatively, current pulse 71 of FIG. 5B causes actuator 51 and thereby platen 43 and the toned web 13 to rapidly accelerate toward the paper 15. Thus, point "A" in FIGS. 5A–5E is that point in time at which the relative movement between the magnetic tape 13 and the paper 15 begins.

When the displacement is such that the distance between the two media becomes relatively small, the velocity of the tape has to be carefully limited so as to not exceed the critical tape velocity to minimize the effects of the air currents generated by the approach of the tape 13 to paper 15 (FIGS. 5C and 5D). The combination of the shape of the cam surface 80, 82 (FIG. 2) and the spring force acting between the platen 43 and the cam shaft results in slowing down the approach velocity of the tape (FIG. 5C) and ultimately establishing a first tape-paper contact at a point "B" in time.

In the case of the arrangement of FIG. 3, when the platen 43 reaches a selected distance or displacement 44 from the paper (FIG. 5D), the drive current 71 is reversed as shown in FIG. 5B to effect deceleration (e.g., at approximately $10^4$ cm/sec$^2$) of the platen and tape or otherwise limit the tap velocity (v) to equal or less than the critical relative approaching velocity ($v_c$). This reverse current, i.e., pulse 71*a*, has a magnitude, as shown, greater than pulse 71 but with a duration considerably less than (e.g., $<\frac{1}{2}$) the duration of pulse 71. The absolute magnitude of the drive current is then reduced to a nominal reversed-direction value to allow the platen and tape to coast for a short while. This approach-movement segment of the drive current profile of FIG. 5B thus enables the platen to be initially accelerated at approximately four gravities, then decelerated at approximately ten gravities and finally allowed to coast to effect a gentle contact between the tape and the paper at point "B". The coasting period is ended with a relatively gradual ramp pulse 71*b* (FIG. 5B) which again tends to urge the platen in the upward direction until contact is uniformly established. The ramp pulse 71*b* thus ensures substantially uniform pressure between tape 13 and paper 15, and "B'" is the point in time at which the toner particles are evenly (uniformly) sandwiched between the tape 13 and paper 15 and the tape becomes fully at rest with the paper, ready for transfer.

During the entire time period between points A and B, actually between points A and C and somewhat before A, as shown in (FIG. 5E), the toner particles are subjected to an electrostatic field force ($f_b$) generated by means of an applied bias voltage which augments the existing magnetic attractive force ($f_m$) between tape and toner and electrostatic attracting forces ($f_e$) between tape and toner provided by precharging the toner, such that the toner particles are urged to remain on the tape throughout the entirety of relative approaching movement between the tape and the paper and establishment of uniform contact between the two. This electrostatic field is generated between the aforementioned conductive portion of the magnetic tape being held at ground potential and a negative potential of predetermined magnitude, say 100 volts (for negatively charged toner), as a biasing voltage applied to electrode 45 (FIG. 1) under the control of controller 25. We have found that a preferred range of bias voltages for generating the bias field is from approximately −20 to −150 volts corresponding, for example, to widely varying humidity conditions, within given systems of commercially available toner and paper. The relationship between the conductive portion of the tape 13 and electrode 45 could be reversed, whereby electrode 45 is maintained at e.g., ground potential and the tape has applied thereto a potential of said predetermined magnitude with a polarity that will effect the desired electrostatic field, to augment, as before, the pre-existing attracting forces on the toner particles which urge same to remain clinging to the tape. The former arrangement, i.e., having the conductive portion of tape at ground potential at all times, is preferred because this provides the dual advantage that the tape will not be allowed to assume the potential of the scorotron during precharging (thus preventing the tape from possibly becoming more negative than the transfer electrode 45 which would tend to urge the toner to transfer without application of the actual transfer pulse) and the tape will be unable to become charged to the same potential as the toner.

At a time "C" following uniform contact between the tape and paper (actually point "C" may occur at "B'" or any time during the period of uniform contact), the polarity and magnitude of the potential in FIG. 5E are changed to result in a reversal of the electrostatic forces on the toner to begin transfer of the toner particles from tape to paper. We have determined that for the within mentioned given systems a preferred range of transfer voltage is +400 to +800 volts (for negatively charged toner), and especially preferred magnitudes of the transfer potential between 600 to 800 volts. Below 400 volts experience has shown that the toner transfer efficiency suffers, and above 800 volts edge acuity tends to degrade.

To complete the transfer of toner to paper, the cam surface of the cam 76 (FIG. 2) is further rotated, or the drive current (FIG. 5B for the arrangement of FIG. 3) is such that at time "D" the platen 43 begins to reverse its travel as indicated in FIG. 5D. (For the embodiment of FIG. 3 this is due to the influence of gravitational forces). The tape, which will follow the platen, thus begins to separate from the paper, leaving behind the toner, under the influence of the electrostatic transfer forces. When separation between the tape and paper has progressed to a predetermined distance, i.e., at time "E" of FIG. 5E, the polarity of the transfer potential is again changed, with the magnitude again set to the bias potential (≈−100 V). Subsequently, the tape segment is transported out of and away from the transfer zone as indicated via FIG. 5A. The period from time "A" to time "E" (FIG. 5A) constitutes a transfer cycle.

Specifically for the separation segment of the preferred drive current profile illustrated in FIG. 5B, to achieve a total minimum transfer cycle time, a current profile substantially mirroring the approach segment profile is utilized. Thus, the platen and tape are allowed to coast (at approximately one gravity) for a short time immediately following actual separation to achieve a selected small displacement (to avoid disruption of the toner particle arrangement on the paper due to the aerodynamic forces of the rushing air associated with the separation). Therefollowing, the platen is positively accelerated downward and then decelerated to zero velocity, in achieving full separation of tape and paper once again.

FIG. 5E further illustrates, via dashed line 86, that the transfer potential need not be held completely constant. However, it is important that the potential be substantially maintained at least until actual transfer has occurred and for a time thereafter.

The pretransfer (bias) and transfer potentials have been selected at least in part to also satisfy the following requirements. The toner must remain on the paper throughout the period of relative separation of tape and paper and subsequent movement of the tape out of the transfer area. On the other hand, it is desired that no background toner be accumulated on the paper from residual toner which may be on the tape and/or from the next arriving toned segment. Thus, the bias field is applied preferably throughout operation at the transfer station except during the time the transfer field is to be generated. The latter field, then, is caused to be present and remain only so long as to permit transfer of toner to the paper, and to provide time for the tape and platen to withdraw to a sufficient, i.e., a separation sufficiently large that the effect of the resumed bias field would not be strong enough to urge the toner particles now on the paper back across the separation to the tape. It should be appreciated that as of this point in time, the toner has not yet been more permanently affixed to the paper surface such as by fusing.

It is to be noted that it is well within the scope of this invention to provide the alternative considerations of precharging the toner positively, with corresponding bias and transfer potentials being accordingly reversed from the above-depicted example.

FIG. 6A depicts a graph of computed critical (maximum) tape velocity as a function of instantaneous separation utilizing equation I for toner-to-substrate (tape) holding forces of $2\times10^{-4}$ dyne per toner particle as an example. Here, it is assumed that $r=10\times10^{-4}$ cm, $\rho=1.3\times10^{-3}$ gm/cc, and $w=1.25$ cm. This magnitude of toner-to-medium force is determined by experimental procedures for typical conditions, i.e., a given system. It should be noted that this force could vary substantially for different systems.

The vertical axis of FIG. 6A represents the tape critical (maximum) velocity in terms of cm/sec and the horizontal axis represents the instantaneous separation of the media (tape and paper) in units of $10^{-4}$ cm. The point "A" indicates the initial separation distance between the media, corresponding to point "A" of FIGS. 5A–5E. The dashed vertical line (identified as "B" to relate in time with point "B" of FIGS. 5A–5E) located at $20\times10^{-4}$ cm indicates the separation distance at which toner particles normally first establish contact with the surface of the paper medium. In the case of a large toned area, one could replace "h" with $(h-\gamma)$, where $\gamma$ is the thickness of the toner layer; and for this case the paper surface is accordingly initially contacted by the toner at $(h-\gamma)=0$.

As is illustrated by the graph of FIG. 6A, in order to not disturb the arrangement of the toner paticles on either of the media and substantially preserve the integrity of the image quality, the approaching critical velocity near and at the point of contact between the substrates must be substantially smaller than the initial high velocities corresponding with the larger separation distances. Indeed, FIG. 6A illustrates the need for substantial reduction of tape velocity approaching the event of contact with the paper in order to prevent the disturbance of the toner particle arrangement.

FIG. 6B illustrates the aforementioned computed critical (maximum) tape velocity as a function of time for an initial separation of $1250\times10^{-4}$ cm and toner-to-substrate forces of $2\times10^{-4}$ dyne per toner particle. In this example calculation, it is depicted that the platen 43 is accelerated from a rest position to a velocity of approximately 30 cm/sec with a corresponding acceleration of 3900 cm/sec$^{-2}$ (approximately four g's). The platen 43 is then allowed to travel approximately $940\times10^{-4}$ cm at this relatively high velocity. However, this velocity becomes critical at approximately the $310\times10^{-4}$ cm separation distance (point Q' of FIG. 6B, corresponding to point Q in FIG. 6A) and, as illustrated in FIG. 6B, the velocity must be reduced drastically in order to prevent disturbance of the toner particle arrangement. Furthermore, as shown in FIG. 6B, the approaching velocity is reduced continuously over a period of time until the toner establishes contact (point B in time) with the surface of the paper medium. Thus, FIG. 6B shows the control of the velocity needed in the time domain to substantially preserve the integrity of the image quality.

Figure 7:
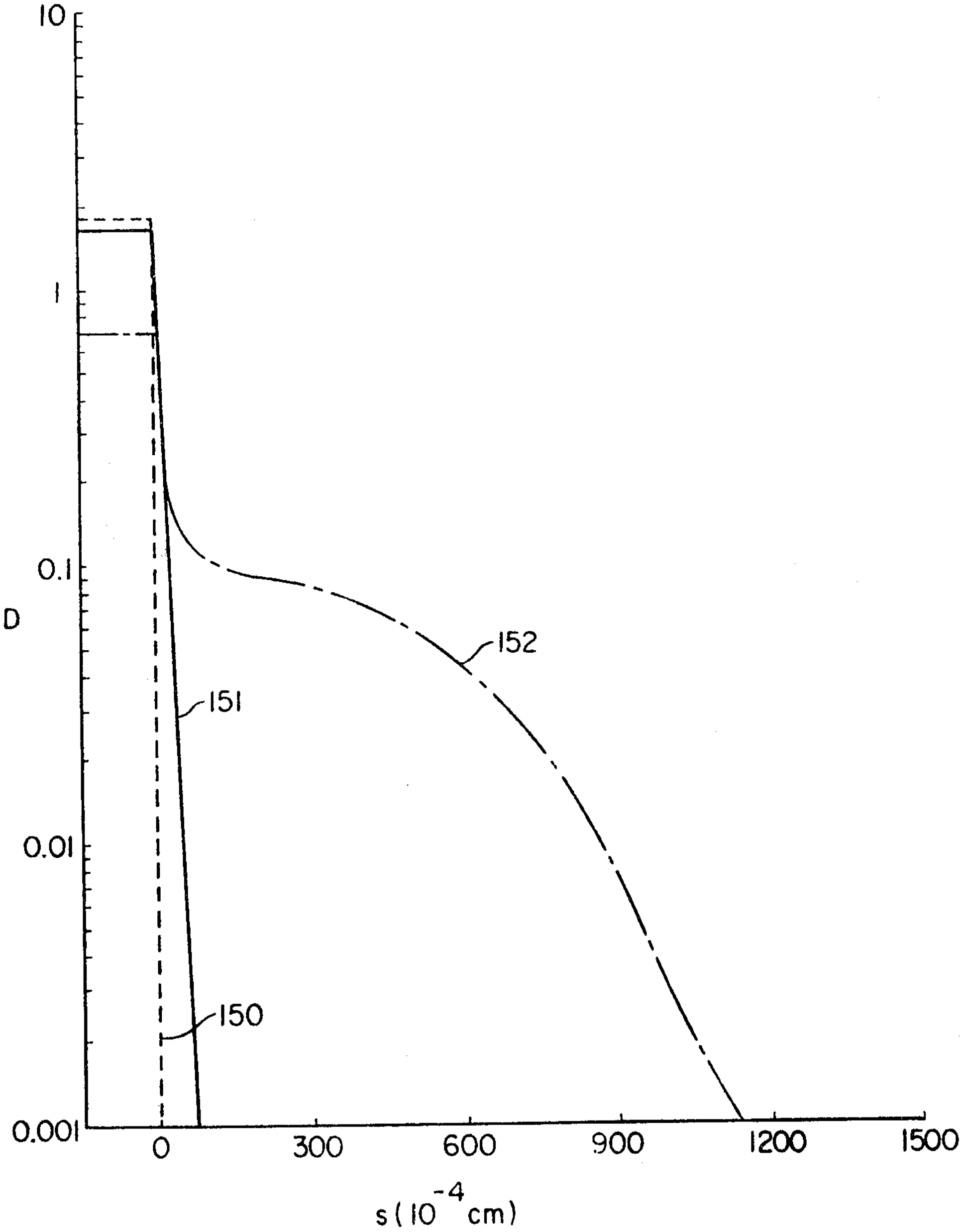
FIG. 7 is a graphic illustration of edge acuity, showing an ideal case, the case of transfer-station tape-to-paper relative velocity within the predetermined maximum of a given system and the case where said maximum for said system is exceeded.

FIG. 7 is a graphic presentation of the optical density, D, of toner on a character image on tape versus the distance, s, in the vicinity of the edge of the toned character image. The dashed line curve 150 corresponds with an ideal density and depicts a very sharp transition of optical density, D, from a high value (e.g., D=1.8) to zero within a relatively immeasurably short distance from the edge of the character image ($s\approx0$) to the immediate surrounding background portion of the paper. The dot/dash line curve 152 depicts a condition of substantial toner spread at the edge of a toned character obtained from experiment in which the approach velocity of the tape has not been closely controlled, i.e., the tape approaching velocity has exceeded the critical (maximum) velocity for the system, and/or the tape has contacted the paper at an excessive velocity (e.g., five cm/sec).

Since the normal naked eye can sense optical densities as low as 0.002, it is clear from curve 152 that the gradual transition of optical density from the edge of the character image (s=0) to distances as large as one millimeter (i.e., $s=1000\times10^{-4}$ cm as depicted in FIG. 7 herein) corresponding to considerable toner spread, is readily detectable and is perceived as relatively poor edge sharpness or acuity. Further, the optical density of the character depicted in curve 152 has suffered, having decreased from 1.8 (chosen ideal case, corresponding to a dark black) to 0.7 (corresponding to a grayish appearance), which additionally degrades the image quality.

The solid curve 151, on the other hand, illustrates a dramatic improvement over curve 152. Curve 151 depicts a typical relatively high speed test in which the instantaneous or approach velocity of the tape was controlled throughout the transfer operation to remain near but below the critical (maximum) velocity, while keeping all other parameters of the system the same. As shown by curve 151, there is no significant amount of toner spread detectable to the human eye within a relatively very small distance of approximately $75\times10^{-4}$ cm. Further, the optical density of the toned character image has been insignificantly affected, i.e., nominally reduced from 1.8 (corresponding to the ideal curve) to 1.7. It is to be noted that at these high optical densities the naked human eye will be unable to appreciate such a small difference.

Figure 8A:
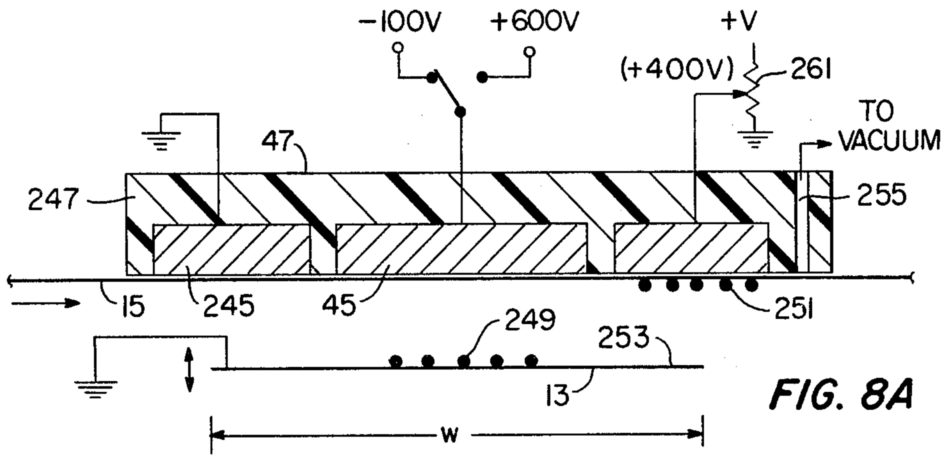
FIG. 8A is a schematic diagram showing a portion of the transfer station of FIG. 2 or 3 embodying apparatus for preventing disturbance and removal of toner from previously transferred images, in accordance with the present invention.

Turning now to FIG. 8A, there is shown an apparatus for maintaining (holding) in place on paper 15 toner particles of a previously transferred image line despite the possibility of a disruptive (lift-off) effect of tape 13 on said particles when a portion (e.g., a margin or edge) of said tape comes into contact with the previously transferred line during transfer to paper of a subsequent image line. The apparatus, shown in FIG. 8A as a left-side view of backplate 47 of FIG. 2 or 3, comprises center or transfer electrode 45, front electrode 145 and, optionally, a rear electrode 245 (or grounded conductive portion of back plate 47 in contact with paper 15) each insulated from the other by for example a non-conductive epoxy material 247 such as Emerson and Cuming Stycast 3050. The center electrode 45 is disposed directly opposite the line of toned images 249 to be transferred (i.e., disposed on the rear side of paper 15 directly opposite the line to be transferred to the front surface of the paper). To achieve transfer, center electrode 45 is provided with a voltage waveform as shown in FIG. 5E and as described hereinabove. Front electrode 145 is disposed proximate to center electrode 45 and a selected distance therefrom (e.g., the proximate edges of electrodes 45 and 145 may be positioned 0.2 centimeters apart, the electrode 145 extending a selected short distance past the edge 253 of the tape), and positioned directly opposite (i.e., positioned on the side of paper 15 opposite from) previously transferred line 251. Line 251 represents an aggregation of previously transferred toned images forming a printed line across the width of page (paper) 15. Optionally, the selected distance between proximate edges of electrodes 45 and 145 may correspond to the distance between imaged lines on said page. Rear electrode 245 is disposed a second selected horizontal distance (e.g., 0.2 centimeters) proximate to and behind center electrode 45 (i.e., disposed on a side of electrode 45 toward the bottom edge of paper 15), and is grounded so that paper 15 coming into the transfer station can become discharged and, thus, would not introduce any static charges into the transfer station area that could possibly adversely effect transfer of toner particles from tape 13 to paper 15. It is preferable to have electrode 245 dimensioned to extend up-stream (i.e., in relation to the direction of intended movement of the paper) as far as practically possible.

Figure 9:
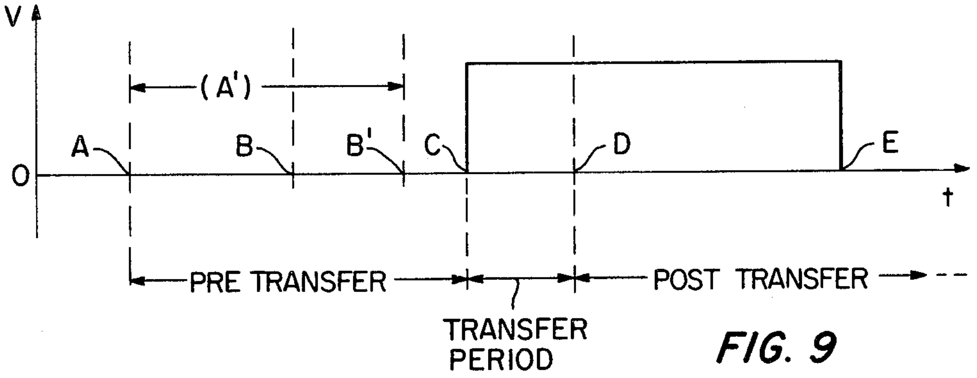
FIG. 9 is a waveform diagram illustrative of a signal applied to a portion of the apparatus of FIG. 8 for preventing toner disturbance and removal from previously transferred images.

Removal of lift-off of toner particles from a previously transferred line image (e.g., from line image 251) can occur when tape 13 separates from paper 15 after having made contact with the paper pursuant to the transfer of line image 249 to the paper. When tape 13 is brought into contact with the paper 15, the marginal edge at 253 of the tape is made to contact the toner particles of line 251 such that when the tape and paper separate there can be a tendency for the edge 253 of the tape to lift-off or remove some of the toner particles from previously transferred line 251. As shown in FIG. 9, to prevent this toner disturbance (lift-off condition), a positive bias voltage (e.g., +400 volts) is applied continuously to front electrode 145, or during the entire transfer period A–E shown in FIG. 5E, or during a selected portion thereof (e.g., C–E) as shown in FIG. 9.

Also, when the transfer pulse is applied to electrode 45, a field is generated between grounded tape 13 and the transfer or center electrode 45. Depending on the magnitude of the transfer pulse relative to that of the anti-lift-off pulse, there can be a tendency for the generated field to force previously transferred toner particles from their respective locations on paper 15 toward the center electrode. By applying a potential (e.g., a +400 bias voltage in the present example) to front electrode 145, a positive field is created which acts substantially vertically on the previously transferred negatively charged toner particles 251 which will retain them in place on paper 15. The field generated by front electrode 145 is selected to be sufficiently strong to hold in place toner particles of the previously transferred line 251 yet sufficiently weak or configured so as not to adversely affect toner 249 being transferred or about to be transferred. This retaining or holding effect is particularly evident under low humidity conditions.

Vacuum port 255 (FIG. 8A) coupled to vacuum sources (not shown) and disposed at selected intervals along backplate 47 provide a means to hold the paper in intimate contact with the bottom surface of backplate 47.

Whereas +400 volts has been preferably selected for application to front electrode 145 in the present example, it has been found that voltage levels in the approximate range of +300 to +600 volts, when applied to front electrode 145, will successfully prevent negatively charged toner 251 from being removed from paper 15 by tape 13 when the latter comes into contact with the former. As charges accumulate on the surface of the tape and/or as the tape becomes worn (e.g., worn such that the mylar layer becomes exposed, thus increasing the chances of charge accumulation), the lift-off condition can become more pronounced. Thus, as shown in FIG. 8A, the applied voltage may be varied by variable resistor or potentiometer 261 to more greatly restrain the toner from leaving the paper.

Figure 8B:
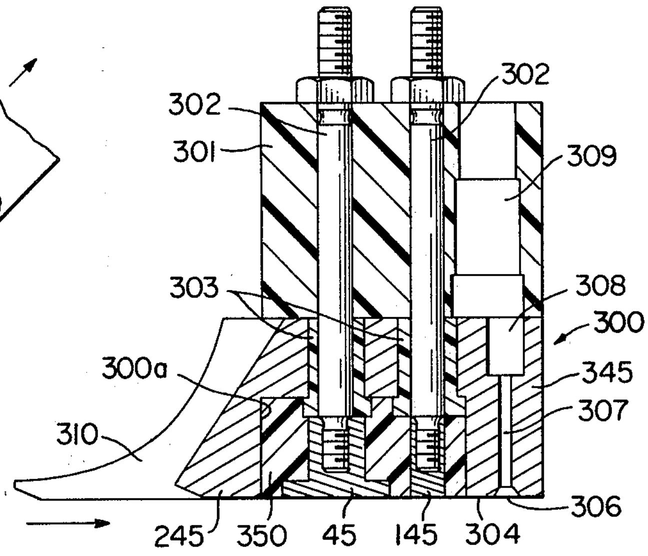
FIG. 8B is a diagrammatic illustration of a preferred arrangement of apparatus depicted in FIG. 8A.

FIG. 8B is a diagrammatical side illustration in cross-section of a preferred embodiment of the transfer station electrode assembly generally depicted in FIG. 8A. In this embodiment, transfer electrode 45 and anti-lift-off electrode 145 are, as before, preceded by discharging electrode 245. However, a further electrode 345, is added to the electrode assembly, which, like electrode 245, is grounded and intended for discharging or otherwise removing excessive charges from the paper 15. In fact, electrodes 245 and 345 are preferably portions of a common conductive piece constituting a front structural housing 300 for the other electrode elements.

In the view presented in FIG. 8B it is to be assumed that the paper (not particularly shown) would move from left to right, and the tape medium is assumed to move perpendicularly thereto out of the page. Thus, the tape runs parallel to the elongated assembly here shown in cross-section.

Electrodes 45 and 145 preferably are housed in a cavity **300*a* formed by the combined electrode elements 245 and 345. Electrodes 45 and 145 are insulated from one another and from the grounded front housing 300 by, for example, an epoxy potting material 350**.

The front portion 300 of the entire depicted electrode assembly is secured to a non-conductive base or backing arrangement 301, made, for example, of LEXAN. Base 301 and front assembly portion 300 are secured together by rods 302 (e.g., made of brass) which are maintained in place and insulated from the electrode assembly 245/345 by, for example, nylon spacers 303. Rods 300 serve the dual purpose of providing the respective conductive paths from electrodes 45 and 145 to sources of electrical energy. The front portion 300 is completed by the vacuum arrangement for holding the paper to the flat operative surface 304. The vacuum arrangement is comprised of a longitudinally running shallow groove 306 in the surface of electrode 345, which extends over all but a short distance from either end of the depicted assembly. Communicating with this groove at substantially equally spaced intervals are a multiplicity of vertically running circular bores 307 which lead to a common trough or recess 308 in the bottom (or back portion) of the front electrode assembly portion 300. Trough 308 communicates with a substantially centrally located (i.e., centrally with respect to the longitudinal dimension of the electrode assembly) channel 309 in base 301 which may be shaped to secure the end coupling of a vacuum hose (not particulary shown).

The front surface area 304 is completed by the front edge of electrode 245 being angled slightly (e.g., at 10° with respect to the flat operative surface) to avoid jamming of the approaching paper. Also, at substantially equally spaced intervals the housing portion constituting electrode element 245 is provided with backwardly-extending (i.e., extending up-stream relative to the direction of paper travel) guides 310 which are designed, as shown, to further facilitate uneventful approach of the patter to the electrode assembly and yet provide room for paper-directing rollers (not particularly shown).

Figure 10A:
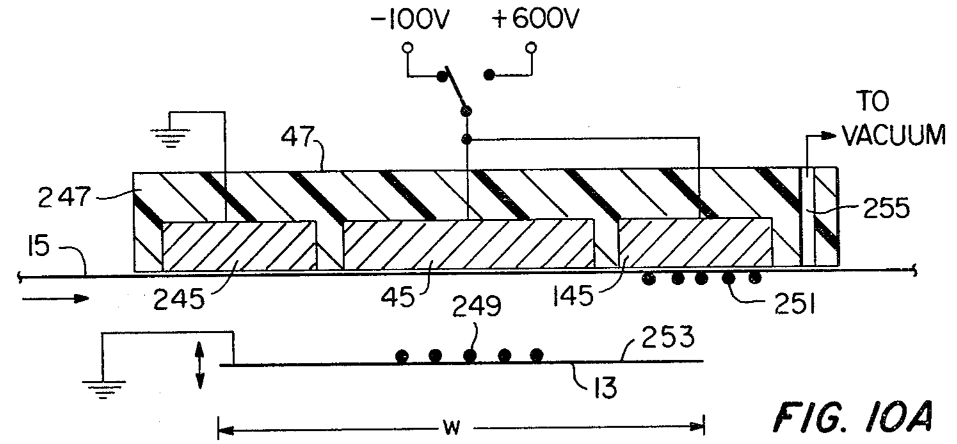
FIGS. 10A–10C are schematic diagrams showing alternative embodiments of apparatus according to the invention.
Figure 10B:
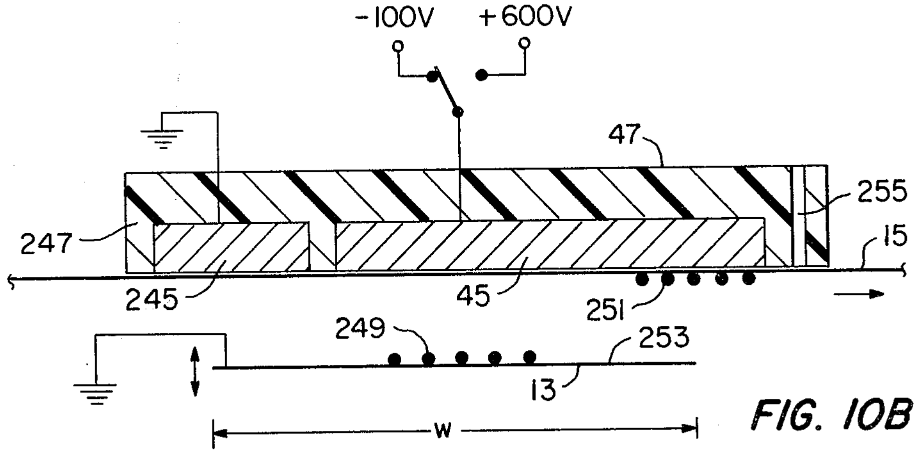

FIGS. 10A and 10B show alternative embodiments of the present invention in which the +600 volt transfer voltage is also used as the anti-lift-off voltage. In FIG. 10A, front electrode 145 is electrically coupled (e.g., by conductor 259) to transfer electrode 45, such that when tape 13 is brought into contact with paper 15 and the +600 volt transfer pulse (FIG. 5E) is applied to electrode 45 to effect transfer of toner 249 from tape 13 to paper 15, this pulse, acting through electrode 145, is also effective in holding toner 251 to the paper 15 and preventing lift-off by tape 13.

In FIG. 10B, the width of center electrode 45 is increased so as to extend to at least the edge 253 of tape 13, thereby being disposed directly opposite both the toner to be transferred 249 and the previously transferred toner 251. The embodiment of FIG. 10B provides toner transfer and anti-lift-off results similar to those provided by the embodiment of FIG. 10A when the +600 volt pulse is applied to electrode 45. The electrode 145 FIG. 10A or that portion of electrode 45 disposed immediately opposite toner 251 FIG. 10B, is also subjected to the −100 volt bias voltage when said bias voltage is applied to electrode 45 (see FIG. 5E). However, this bias voltage is not high enough to cause measurable toner lift-off when tape 13 comes into contact with paper 15.

Figure 11:
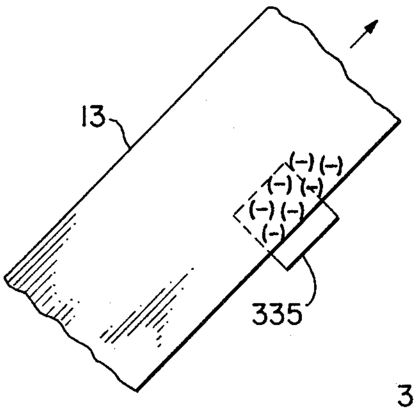
FIG. 11 is a graphic illustration of charges produced at an edge of a magnetic tape medium usable in the apparatus of FIG. 10, which charges may be produced by an apparatus of FIG. 1.
Figure 10C:
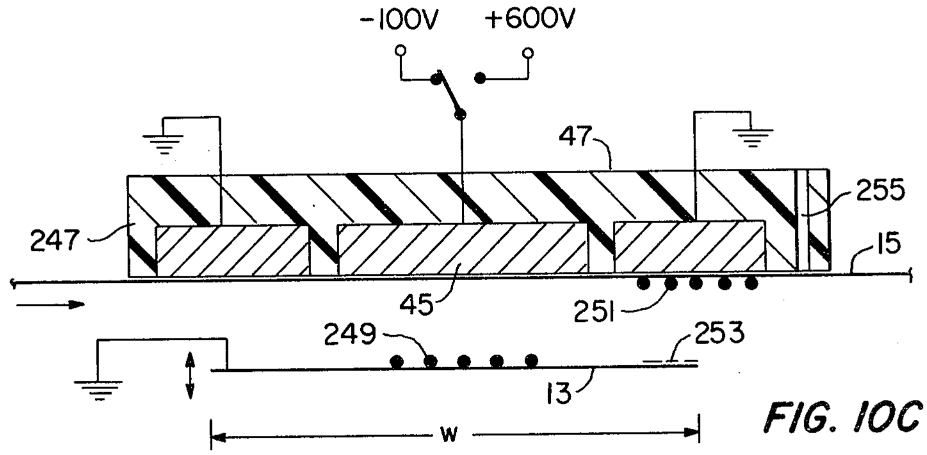

FIG. 10C depicts yet another embodiment of the present invention. Here, front electrode 145 may be grounded, and the top layer of tape 13 may be subjected to a negative charge depositing source to charge the top edge 253 of the tape disposed opposite the toner 251 to the same polarity as that of toner 251 thereby creating an electrostatic field negating a possible lift-off effect of tape 13 when the tape is separated from paper 15 after contact with said paper. This depositing of negative charges on the front edge of tape 13 can be accomplished by means of a scorotron 335 as shown in FIG. 11. Also, the edge 253 of the tape may be coated with a durable material having suitable electric characteristic such as being triboelectrically inactive. For example, the tape may be coated with a polyurethane material that adheres to the mylar layer of the tape and that is durable and does not become strongly charged, the polyurethane material comprising a combination of a thermal plastic resin such as ESTANE 5703 and a copolymer such as SARAN F-310.

We claim:

1. In a magnetographic printing system utilizing magnetic tape on which magnetic images are developed with toner particles and then the tape is then momentarily moved into contact with a first surface of a first medium to which said toner particles are transferred in a toner transfer station, the improvement comprising means external to said toner transfer station for retaining at least one previously transferred arrangement of toner particles on said first surface at least during subsequent transfer of another arrangement of toner particles from said magnetic tape to said first surface to prevent disturbance of said previously transferred toner by both said tape recontacting same when said tape again contacts said first medium to transfer said another arrangement of toner particles and by aerodynamic forces caused by said tape repeatedly moving into and out of contact with said first medium.

2. In a system according to claim 1, wherein said retaining means comprises electrode means for effecting an electrostatic field in the vicinity of said previously transferred toner arrangement external to said transfer station, said field having a direction which tends to urge said previously transferred toner arrangement to remain on said first surface and not be disturbed during at least a subsequent toner arrangement transfer.

3. In a system according to claim 2, means for housing said electrode means, said housing means including means acting on the second surface of said first medium for controllably holding the first medium to a first surface of said housing means.

4. Apparatus for holding unfixed toner images on a medium such as paper to which the images are to be fixed while other toner images are being transferred to the medium in a transfer station of a magnetographic printing system in which electrically charged magnetic toner particles are used to develop a first group of characters on a magnetic tape on which the characters are magnetically recorded and the toned tape is then moved into physical planar contact with a said medium in the transfer station, a first electrode in the transfer station is used to create a first electric field through the paper and tape to transfer the toner on the tape to the paper, a second electric field of lower intensity is then created in the transfer station using the first electrode to hold the toner on the paper as the tape is moved out of physical contact therewith, the paper is advanced to move the characters out of the transfer station and another group of toned image characters on another segment of the magnetic tape are moved into the transfer station in position for toner transfer, the holding apparatus comprising:

a. a second electrode external to said transfer station and used to create an electric field through said paper to hold said first group of toned image characters on said paper to prevent them from being disturbed by motion of the paper by said tape as it again comes into physical contact with said paper to transfer said another group of toned image characters, and by stray electric fields created by said first electrode as said another group of toned image characters is being transferred from said tape to said medium.

5. The invention in accordance with claim 4 further comprising means adjacent to said medium and between said first and second electrodes to only remove an electrical charge on said paper as said first group of toned image characters passes from said toner transfer station.

6. A method used in a magnetrographic printing system in which magnetic images on a magnetic tape are developed with electrically charged magnetic toner particles and then said tape is momentarily moved into contact with a first surface of a first medium in a toner transfer station to transfer said toner to said first medium, the method used for preventing disturbance of previously transferred toner by said tape recontacting said first medium, and comprising the steps of:

a. effecting the transfer of a first toner arrangement from said tape to said first medium in said transfer station, the toner particles of said toner arrangement having a preselected charge thereon;

b. thereafter effecting the transfer of a second toner arrangement from said tape to said first medium in said transfer station, the toner particles of said second arrangement having a preselected charge thereon; and c. effecting an electrostatic field external to said transfer station which urges said previously transferred toner arrangement to remain on said first medium and not be disturbed at least during the transfer of the second toner arrangement to the first medium by electrical fields from said transfer station and by said tape recontacting said first medium to transfer said second toner arrangement.

* * * * *